(12) United States Patent
Cai et al.

(10) Patent No.: US 7,493,117 B2
(45) Date of Patent: *Feb. 17, 2009

(54) METHOD AND APPARATUS FOR CONTROLLING ACCESS TO A MULTIMEDIA BROADCAST MULTICAST SERVICE IN A PACKET DATA COMMUNICATION SYSTEM

(75) Inventors: Zhijun Cai, North Richland Hills, TX (US); Ban Al-Bakri, Juan Les Pins (AT); Richard Burbidge, Hook (GB)

(73) Assignee: Motorola, Inc., Schaumburg, IL (US)

( * ) Notice: Subject to any disclaimer, the term of this patent is extended or adjusted under 35 U.S.C. 154(b) by 601 days.

This patent is subject to a terminal disclaimer.

(21) Appl. No.: 10/554,154

(22) PCT Filed: Apr. 23, 2004

(86) PCT No.: PCT/EP2004/050596

§ 371 (c)(1),
(2), (4) Date: Oct. 20, 2005

(87) PCT Pub. No.: WO2004/100590

PCT Pub. Date: Nov. 18, 2004

(65) Prior Publication Data

US 2006/0252439 A1    Nov. 9, 2006

(30) Foreign Application Priority Data

May 9, 2003   (EP) .................................. 03291106

(51) Int. Cl.
*H04Q 7/20* (2006.01)
(52) U.S. Cl. .................... 455/434; 455/412.2; 455/450
(58) Field of Classification Search ................. 455/434, 455/454
See application file for complete search history.

(56) References Cited

U.S. PATENT DOCUMENTS 6,987,749 B2 *   1/2006   Cai et al. .................... 370/335

(Continued)

FOREIGN PATENT DOCUMENTS

WO            0165817 A1      9/2001

(Continued)

OTHER PUBLICATIONS

3GPP TSG-RAN2/3 Joint MBMS Meeting #1, Wokingham, Berks, UK, Jan. 15-16, 2003; 2gpp document Tdoc R2—3—63 cited in the application.

(Continued)

*Primary Examiner*—Alexander Eisen
*Assistant Examiner*—Dai A Phuong

(57) ABSTRACT

A communication system (100) determines whether to establish a point-to-multipoint communication or a point-to-point communication for conveyance of Multimedia Broadcast Multicast Service (MBMS) data based on a number of mobile stations (MSs) (102-104), both idle mode and maintaining an active connection, serviced by the system and subscribed to an MBMS service. The system, broadcasts (306) a control message that includes an access probability factor. In order to avoid overloading the system with responses to the control message, MSs maintaining an active connection ignore (506, 508) the control message while idle mode MSs determine (506, 512) whether to respond based on the access probability factor. The system compares (310) a number of received responses to a threshold and determines whether to establish a point-to-multipoint communication (312) or a point-to-point communication (322) based on the comparison. The system also adjusts (314, 330) the access probability factor based on the number of responses.

24 Claims, 6 Drawing Sheets

U.S. PATENT DOCUMENTS

2004/0157640 A1* 8/2004 Pirskanen et al. ......... 455/552.1
2007/0086441 A1* 4/2007 Kall et al. ................... 370/352

FOREIGN PATENT DOCUMENTS

WO   03030431 A1   4/2003

OTHER PUBLICATIONS

TSG_RAN Meeting #19, Birmingham UK, 11-4 Mar. 2003; Satus Report of WI Introduction of the Multimedia Broadcast Multicast Service (MBMS) in RAN, p. 2.

* cited by examiner

US 7,493,117 B2

METHOD AND APPARATUS FOR CONTROLLING ACCESS TO A MULTIMEDIA BROADCAST MULTICAST SERVICE IN A PACKET DATA COMMUNICATION SYSTEM

FIELD OF THE INVENTION

The present invention relates generally to packet data communication systems, and, in particular, to a multimedia broadcast multicast service in a packet data communication system.

BACKGROUND OF THE INVENTION

The Universal Mobile Telecommunication Service (UMTS) standard provides a compatibility standard for cellular mobile telecommunications systems. The UMTS standard ensures that a mobile station (MS), or a user equipment (UE), operating in a UMTS system can obtain communication services when operating in a system manufactured according to the standard. To ensure compatibility, radio system parameters and data transfer procedures are specified by the standard, including protocols governing digital control messages and bearer traffic that are exchanged over an air interface.

The UMTS standards provide, in 3GPP TS 25.346 (Third Generation Partnership Project Technical Specification 25.346) v0.5.0 and 3GPP TS 23.846 v6.0.0, for a provision of a Multimedia Broadcast Multicast Service (MBMS) service by a UMTS communication system to UEs serviced by the system. The MBMS service provides for a multicast and unicast of MBMS data, typically in a format of Internet Protocol (IP) data packets to one or more of the UEs. In order to ensure that the air interface resources of the UMTS communication) system are not wasted, the system must first estimate the number of recipients, that is subscribed UEs, in a cell providing MBMS deals. Based on the estimated number of recipients, the system then determines whether to establish a Point-To-Multipoint (PTM) communication channel in the cell or a Point-To-Point (PTP) channel to each recipient. When the estimated number of recipients in the cell exceeds an operator defined threshold, the system establishes a PTM channel in the cell. When the estimated number of recipients in the cell is less than the operator defined threshold, the system establishes a PTP channel to each subscribing MS in the cell.

Typically, the system estimates the number of recipients based on a number of UEs subscribing to MBMS services that are active over established connections. Based on the estimate, a Radio Network Controller (RNC) included in a UMTS infrastructure determines whether to establish a PTM communication channel in the cell or a PTP communication channel to each UE. The RNC then broadcasts a MBMS notification via a Node B, typically a base transceiver station (BTS), and a control channel to all UEs in the cell. The notification typically includes an identifier associated with the MBMS service. In response to receiving the MBMS notification, each UE in the cell that subscribes to the MBMS service may then convey a connection request, typically a Radio Resource Control (RRC) connection establishment request, to the RNC via an access channel. Upon receiving the connection requests from each of the subscribing UEs, the RNC establishes a PTM communication channel or establishes PTP communication channels with each responding UE, whichever the RNC has determined to establish, and conveys the MBMS data to the subscribing UEs over the established channel or channels.

In order to limit the number of connection requests generated in response to the MBMS notification, it has been proposed to broadcast an access probability factor in conjunction with the MBMS notification. However, a problem arises in that, typically, the RNC is not aware of a number of idle mode UEs in a cell that have subscribed to an MBMS service. Since the idle mode UEs do not have active connections with the RNC, the RNC does not count these UEs when estimating a number of recipients of the MBMS data. When the access probability factor is set to a high value and the number of idle mode UEs subscribing to the MBMS service is also large, an access channel can be overloaded by the number of connection requests generated in response to the MBMS notification. In the event of a system overload, the UMTS standards permit an operator of the system to employ a back-off mechanism. However, back-off mechanisms produce connection set-up delays and waste RF resources as UEs must repeatedly transmit connection requests. On the other hand, when the access probability factor is set to a low value and the number of idle mode MSs subscribing to the MBMS service is small, the number of connection requests received by the RNC in response to a counting request may be insufficient to invoke establishment of a PTM channel when a PTM channel may be the most efficient scheme for disseminating the multimedia data.

Therefore, a need exists for a method and apparatus that provides a more accurate estimate of a number of mobile stations serviced by a system and subscribed to MBMS service, including idle mode mobile stations, while limiting a number of connection requests generated in response to an MBMS notification, and that provides for dynamic adjustment of an access probability factor that controls the number of connection requests.

DETAILED DESCRIPTION OF THE INVENTION

Figure 1:
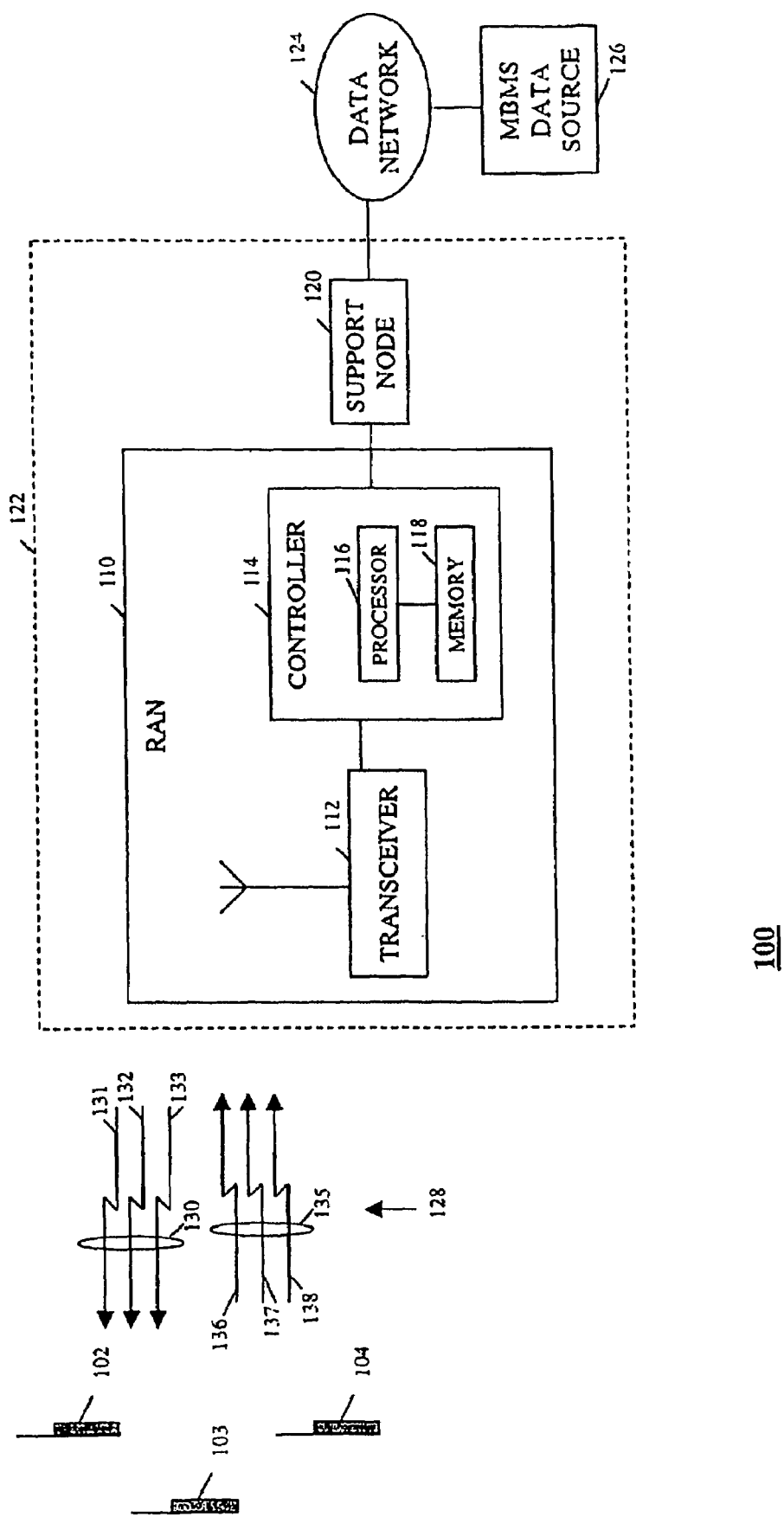
FIG. 1 is a block diagram of a wireless communication system in accordance with an embodiment of the present invention.

To address the need for a method and an apparatus that that provides a more accurate estimate of a number of mobile stations serviced by a system and subscribed to MBMS service, including idle mode mobile stations, while limiting a number of connection requests generated in response to an MBMS notification, and that provides for dynamic adjustment of an access probability factor that controls the number of connection requests, a communication system determines whether to establish a point-to-multipoint communication or a point-to-point communication for conveyance of Multimedia Broadcast Multicast Service (MBMS) data based on a number of mobile stations, both idle mode and maintaining an active connection, serviced by the system and subscribed to an MBMS service. The system broadcasts a control message that includes an access probability factor. In order to avoid overloading the system with a number of responses generated in response to the control message, mobile stations maintaining an active connection ignore the control message while idle mode mobile stations determine whether to respond based on the access probability factor. The system compares a number of responses received in response to the control message to a threshold and determines whether to establish a point-to-multipoint communication or a point-to-point communication based on the comparison. The system also adjusts the access probability factor based on the number of responses.

Generally, an embodiment of the present invention encompasses a method for controlling access to a Multimedia Broadcast Multicast Service (MBMS) service. The method includes determining a quantity of mobile stations subscribed to the MBMS service and maintaining an active connection, determining an access probability factor, and broadcasting a control message comprising the access probability factor. The method further includes receiving, from each of one or more idle mode mobile stations, a response to the control message, comparing the number of received responses to a threshold to produce a comparison, and determining whether to establish a point-to-multipoint communication or a point-to-point communication based on the comparison.

Another embodiment of the present invention encompasses a method for accessing a Multimedia Broadcast Multicast Service (MBMS) service. The method includes receiving, by a mobile station, a control message associated with the MBMS service and comprising an access probability factor. The method further includes ignoring the control message when an active connection exists between the mobile station and an infrastructure and, when an active connection does not exist between the mobile station and an infrastructure, determining whether to respond to the control message based on the access probability factor.

Yet another embodiment of the present invention encompasses an apparatus for controlling access to a Multimedia Broadcast Multicast Service (MBMS) service. The apparatus includes at least one memory device that maintains an access probability factor and further maintains a record of a quantity of mobile stations subscribed to the MBMS service and maintaining an active connection. The apparatus further includes a processor coupled to the at least one memory device that determines a quantity of mobile stations subscribed to the MBMS service and maintaining an active connection and an access probability factor by reference to the at least one memory device, conveys a control message comprising the access probability factor, receives, from each of one or more idle mode mobile stations, a response to the control message; compares the number of received responses to a threshold to produce a comparison, and determines whether to establish a point-to-multipoint communication or a point-to-point communication based on the comparison.

Still another embodiment of the present invention encompasses a mobile station capable of accessing a Multimedia Broadcast Multicast Service (MBMS) service. The mobile station includes a receiver that receives a control message associated with the MBMS service and comprising and access probability factor. The mobile station further includes a processor operably coupled to the receiver that receives the control message from the receiver, ignores the control message when an active connection exists between the mobile station and an infrastructure, and, when an active connection does not exist between the mobile station and an infrastructure, determines whether to respond to the control message based on the access probability factor.

The present invention may be more fully described with reference to FIGS. 1-5. FIG. 1 is a block diagram of a wireless communication system 100 in accordance with an embodiment of the present invention. Communication system 100 includes multiple mobile stations (MSs), or user equipment, 102-104 (three shown) in wireless communication with a Radio Access Network (RAN) 110. RAN 110 includes at least one transceiver, or Node B, 112 that is operably coupled to a controller 114, preferably a Radio Network Controller (RNC). Communication system 100 further includes a support node 120 coupled to RAN 110. Support node 120 typically includes one or more Serving 3G-GPRS Support Nodes (SGSNs) that are each coupled to one or more 3G-Gateway GPRS Support Nodes (GGSNs). However, the precise architecture of support node 120 is tip to an operator of communication system 100 and is not critical to the present invention. Together, RAN 110 and support node 120 are collectively referred to herein as an infrastructure 122.

Each of MSs 102-104 subscribes to a Multimedia Broadcast Multicast Service (MBMS) service provided by communication system 100, which service provides for a distribution of MBMS data to the MSs. MBMS services are described in detail in the 3GPP (Third Generation Partnership Project) standards, and in particular 3GPP TS (Technical Specification) 25.346 v0.5.0, 3GPP TS 23.846 v6.0.0, 3GPP TS 22.146 v6.0.0, 3GPP TR (Technical Report) 21.905 v5.4.0, and Report R2-030063, which specifications and reports are hereby incorporated by reference herein and copies of which may be obtained from the 3GPP via the Internet or from the 3GPP Organization Partners' Publications Offices at Mobile Competence Centre 650, route des Lucioles, 06921 Sophia-Antipolis Cedex, France.

RAN 110 provides communications services to mobile stations, such a MS 102-104, located in a coverage area, such as a cell, serviced by the RAN via in air interface 128. Air interface 128 comprises a downlink 130 and an uplink 135 that each includes multiple communication channels. Preferably, downlink 130 includes a paging channel 131, at least one downlink control channel 132, and at least one downlink traffic channel 133. Preferably, uplink link 135 includes an uplink access channel 136, at least one uplink signaling channel 137, and at least one uplink traffic channel 138.

Figure 2:
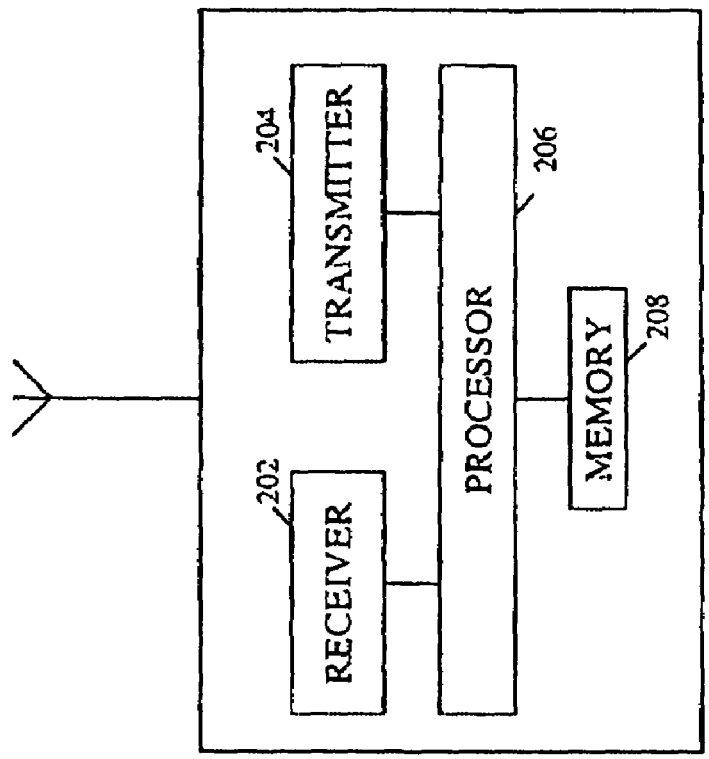
FIG. 2 is a block diagram of a mobile station of FIG. 1 in accordance with an embodiment of the present invention.

Referring now to FIGS. 1 and 2, controller 114 and each of MSs 102-104 includes a respective processor 116, 206 such as one or more microprocessors, microcontrollers, digital signal processors (DSPs), combinations thereof or such other devices known to those having ordinary skill in the art. Controller 114 and each of MSs 102-104 further includes a respective one or more memory devices 118, 208 associated with the respective processor, such as random access memory (RAM), dynamic random access memory (DRAM), and/or read only memory (ROM) or equivalents thereof, that store data and programs that may be executed by the processor and allow the processor to operate in communication system 100. The one or more memory devices 118 of controller 114 further maintains information concerning all MSs that are serviced by the controller and that currently maintain an active connection with RAN 110. Each of MSs 102-104 further includes a receiver 202 and a transmitter 204 that are operably coupled to processor 206 and that respectively provide for receiving and transmitting messages by the MS.

Preferably, communication system 100 is a Universal Mobile Telecommunication Service (UMTS) communication system that operates in accordance with the 3GPP (Third Generation Partnership Project) standards, which provide a compatibility standard for UMTS air interfaces and which standards are hereby incorporated herein in their entirety. The standards specify wireless telecommunications system operating protocols, including radio system parameters and call processing procedures. In communication system 100, the communication channels of forward link 130 or reverse link 135, such as access channels, control channels, paging channels, and traffic channels, each comprises one or more of multiple time slots in a same frequency bandwidth. However, those who are of ordinary skill in the art realize that communication system 100 may operate in accordance with any wireless telecommunication system, such as but not limited to a General Packet Radio Service (GPRS) communication system, a Code Division Multiple Access (CDMA) 2000 communication system, or an Orthogonal Frequency Division Multiple Access (OFDM) communication system.

Communication system 100 further includes a Multimedia Broadcast Multicast Service (MBMS) data source 126, such as an Internet Protocol (IP) multicast server, that is coupled to infrastructure 122, and in particular to support node 120, via a data network 124, such as an IP network. As part of the MBMS service subscribed to by each of MSs 102-104, MBMS data source 126 sources MBMS data, typically in the form of IP data packets, to MSs 102-104 via support node 120 and RAN 110, and in particular via controllers servicing the service subscribers, that is, controller 114 with respect to MSs 102-104. When RAN 110, and in particular controller 114, receives the MBMS data, the RAN must then determine whether to convey the MBMS data to each of the subscribing MSs serviced by the RAN, that is MSs 102-304, via a multicast, or Point-To-Multipoint (PTM), communication channel or individual unicast, or Point-To-Point (PTP), communication channels.

In order to determine whether to establish a PTM communication channel or individual PTP communication channels, RAN 110 must first estimate the number of MSs located in the coverage area serviced by the RAN and subscribing to the MBMS service sourcing the MBMS data and determine an access probability factor based on the estimate. In prior art proposals, a RAN determines an access probability factor based on a number of MSs with active connections to the RAN and subscribing to the MBMS service. However, such a determination fails to account for idle mode MSs serviced by the RAN and subscribing to the MBMS service. As a result, in the prior art, when a large number of idle MSs subscribe to the service and the access probability factor is set to a high value, the determined an access probability factor could result in an overloading of an access channel by a number of MSs responding to an MBMS notification or, when a small number of idle MSs subscribed to the service and the RAN set an access probability factor to a low value, the number of connection requests received by the RNC in response to a counting request may be insufficient to invoke establishment of a PTM channel when a PTM channel may be the most efficient scheme for disseminating the multimedia data.

Figure 3A:
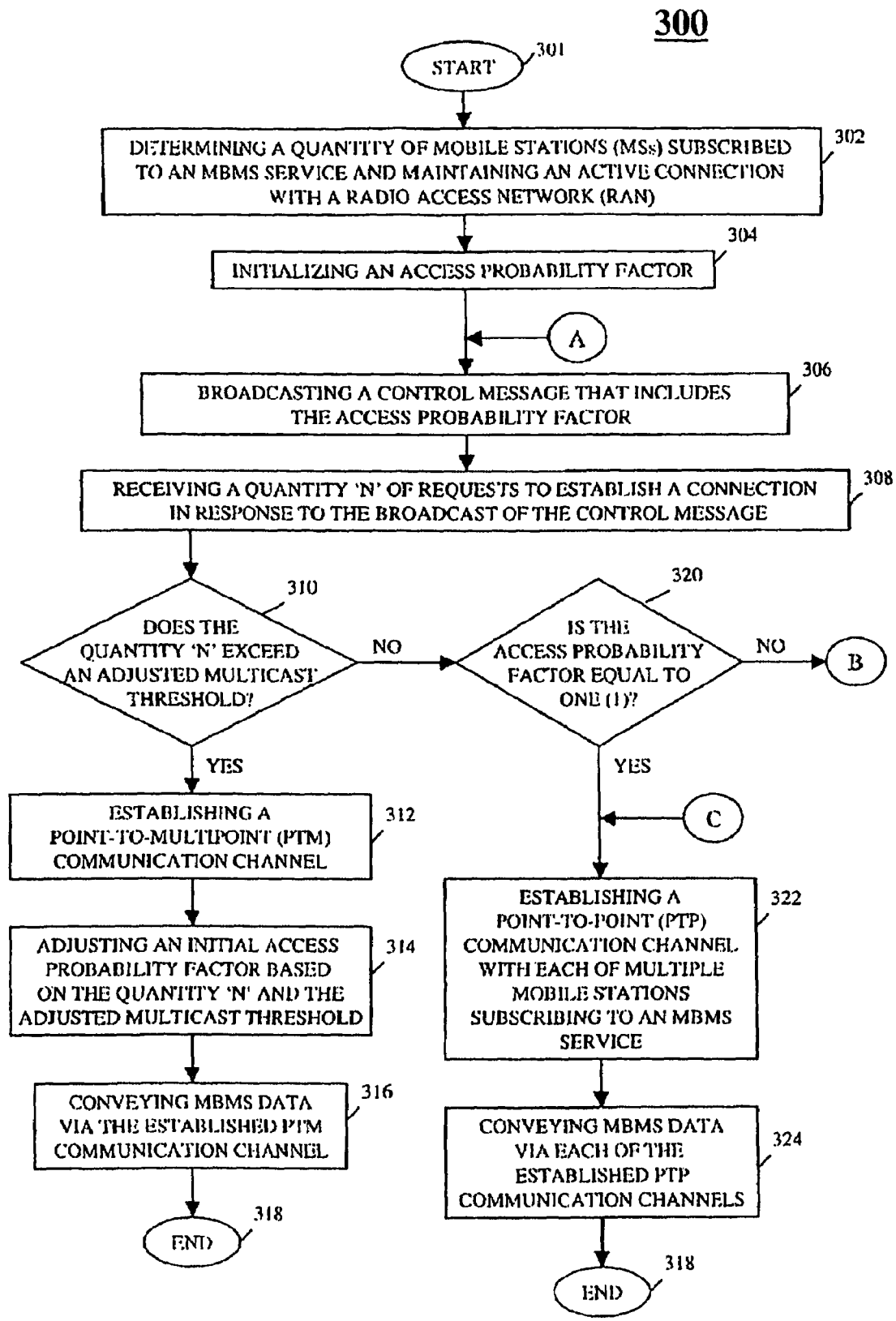
FIG. 3A is a logic flow diagram depicting a method for determining whether to establish a Point-To-Multipoint (PTM) communication or a Point-to-Point (PTP) communication for conveyance of Multimedia Broadcast Multicast Service (MBMS) data to subscribing mobile stations in accordance with an embodiment of the present invention.
Figure 3B:
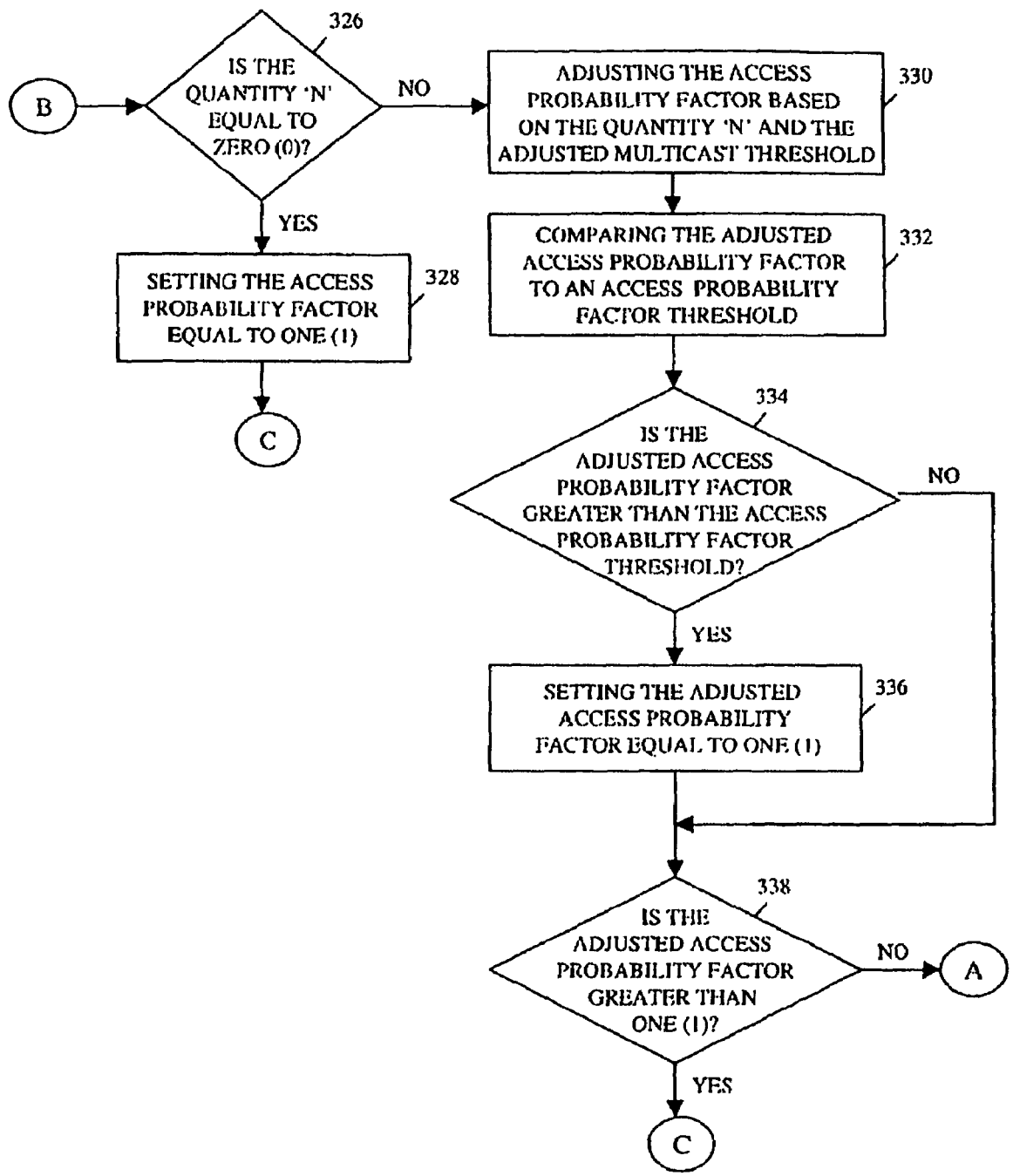
FIG. 3B is a continuation of the logic flow diagram of FIG. 3A depicting a method for determining whether to establish a PTM communication or a PTP communication for conveyance of MBMS data to subscribing mobile stations in accordance with an embodiment of the present invention.

In order to prevent all uplink access channel 136 from being, overwhelmed by connection requests in response to an MBMS notification, and to provide for an appropriate selection of a PTM connection or individual PTP connections for conveyance of MBMS data, communication system 100 provides for a more accurate method of estimating a number of MSs subscribing to an MBMS service and located in a service area of RAN 110 while limiting a number of MSs responding to the MBMS notification, and further provides an adoptively determined access probability factor to optimize the number of responses and the estimate of the number of subscribing MSs. FIGS. 3A and 3B depict a logic flow diagram 300 of a method executed by communication system 100 in estimating a number of MSs subscribing to an MBMS service and determining whether to establish a PTM communication a PTP communication for conveyance of MBMS data in accordance with an embodiment of the present invention. Logic flow diagram 300 begins (301) when RAN 110, and in particular controller 114, determines (302) a quantity of MSs subscribed to the MBMS service and maintaining an active connection with the RAN. Preferably processor 116 of controller 114 determines the quantity of MSs maintaining an active connection with the RAN by reference to memory 118. Unless otherwise specified herein, all functions performed herein by RAN 110 are performed by controller 114, and specifically by processor 116 of controller 114. Furthermore, unless otherwise specified herein, all functions performed herein by controller 114 are performed by processor 116 of controller 114.

RAN 110, specifically controller 114, initializes (304) an access probability factor 'P,' that is, sets 'P' equal to an initial access probability factor, '$P_{init}$,' that is maintained in memory 118 or determined based on an algorithm) maintained in memory 118 of controller 114. RAN 110 then broadcasts (306), via transceiver 112 and downlink control channel 132, preferably an MBMS control channel, one or more control messages that includes the initialized access probability factor 'P.' The one or more control messages further includes information that allows each MS 102-104 to determine that the MS is an intended recipient of the message, such as an identifier associated with the MBMS service, an identifier associated with an MBMS service group of which each MS 102-104 is a member, or an identifier uniquely associated with each MS 102-104 that is a member of the MBMS service group and/or subscribes to the MBMS service. Preferably, the one or more control messages comprise a modified version of an MBMS notification message that is defined in 3GPP TS 23.846 v6.0.0, which notification message is modified to include the access probability factor.

In response to broadcasting the one or more control messages that includes the access probability factor 'P,' RAN 110 receives (308) a quantity of responses 'N,' preferably requests to establish a connection, via uplink access channel 136. The responses are conveyed to RAN 10 only by idle mode MSs subscribed to the MBMS service, as each MS subscribed to the MBMS service and maintaining an active connection to the RAN ignores, that is, does not respond to, the one or more control messages. Preferably, each request to establish a connection comprises a connection request, such as a Radio Resource Control (RRC) connection establishment request, and corresponds to an MS, such as MSs 102-104, subscribing the MBMS service and desirous of establishing a connection and receiving the MBMS data. Since communication system 100 adaptively determines the access probability factor 'P,' the initial access probability factor '$P_{init}$' can be set small enough to ensure that responses to the broadcast control message do not overload access channel 136.

For example, in one embodiment of the present invention, the initial access probability factor '$P_{init}$' may be determined by RAN 110 by solving the following equation for $P_{init}$, which equation may be maintained in memory 118 of controller 114:

$$\sum_{i=0}^{M} C_L^i P_{init}^i (1 - P_{init})^{L-i} \le 1 - p.$$

The factor 'M' corresponds to an adjusted multicast threshold, that is, to a multicast threshold that is reduced by the quantity of MSs subscribed to the MBMS service and maintaining an active connection with the RAN. The multicast threshold may be predetermined by the operator of system 100 and may be maintained in memory 118 of controller 114 and corresponds to a quantity of responding MSs below which the RAN will establish individual PTP communication channels and above which the RAN will establish a PTM communication channel to distribute the MBMS data. Preferably, the multicast threshold is a fixed value that may be determined based on system simulations or past experience. Controller 114 then determines the adjusted multicast threshold 'M' by reference to memory 118 and based on the determined quantity of MSs subscribed to the MBMS service and maintaining an active connection with the RAN. The factor 'p' corresponds to single-broadcast success probability, that is, a probability that only a single iteration will be needed to estimate the number of MSs subscribing to the MBMS service and serviced by RAN 110. The factor '$C_L^i$' corresponds to a combination factor and refers to selecting 'i' objects from a set comprising 'L' objects. For example, '$C_{10}^3$' may correspond to selecting 3 users from a set of 10 users. The parameter 'L' corresponds to a target maximum number of idle mode MSs. For example, if one desired to make a single broadcast of the access probability factor successful, and the probability is greater than 0.95 (95 percent) that the number of idle mode MSs is less than 200, and 0.95 is an acceptable probability, then L may be set equal to 200.

RAN 110 then compares (310) the quantity of responses 'N' to the adjusted multicast threshold 'M' to produce a comparison and, based on the comparison, determines whether to establish a PTP communication or a PTM communication for conveyance of the MBMS data. When RAN 110 determines (310) that 'N' is greater than 'M,' the RAN establishes (312) a PTM communication channel in accordance with well known techniques and adjusts (314) the initial access probability factor '$P_{init}$' based on the quantity of responses 'N' and the adjusted multicast threshold 'M.' Preferably, RAN 110 sets the initial access probability factor '$P_{init}$' equal to P*M/N, that is, sets $P_{init}$=P*M/N. By adjusting the access probability factor based on the number of responses received in response to the broadcast of the control message, RAN 110 implements an access probability factor that is low enough that it limits the quantity of responses to a number that will not overload the access channel and is high enough that the quantity of responses will properly invoke a PTM communication or a PTP communication for conveyance of the MBMS data. RAN 110 then conveys (316) the MBMS data to subscribing MSs 102-104 via transceiver 112 and the established PTM communication channel. The logic flow then ends (318).

When RAN 110 determines (3110) that the quantity of responses 'N' is less than or equal to the adjusted multicast threshold 'M,' the RAN further determines whether to establish a PTP communication or a PTM communication for conveyance of the MBMS data based on the access probability factor. RAN 110 determines (320) whether the access probability factor 'P' is equal to one (1), that is, whether P=1. When RAN 110 determines that 'P' is equal to one (1), the RAN establishes (322) a PTP communication channel in accordance with well known techniques with each MS 102-104 responding to the control message and conveys (324), via transceiver 112 and the established PTP communication channels, the MBMS (data to each of the MSs. The logic flow then ends (318).

When RAN 110 determines that the access probability factor 'P' is not equal to one (1), the RAN further determines whether to establish a PTP communication or a PTM communication for conveyance of the MBMS data based on the received quantity of responses 'N.' Preferably, RAN 110 determines whether to establish a PTP communication or a PTM communication by determining (326) whether the quantity of responses 'N' is equal to zero (0), that is, whether N=0. When RAN 110 determines (326) that the quantity of responses 'N' is equal to zero (0), then the RAN sets (328) the access probability factor 'P' equal to one (1) and establishes (322) a PTP communication channel in accordance with well known techniques with each MS 102-104 responding to the control message. RAN 110 then conveys (324), via transceiver 112 and the established PTP communication channels, lie MBMS data to each of the MSs. The logic flow then ends (318).

When RAN 110 determines (326) that the quantity of responses 'N' is not equal to zero (0), then the RAN adjusts (330) the access probability factor 'P' based on the quantity of responses 'N' and the adjusted multicast threshold 'M.' Preferably, RAN 110 adjusts the access probability factor 'P' by setting 'P' equal P*M/N, that is, setting P=P*M/N. RAN 110 then compares (332) the adjusted access probability factor 'P' to an access probability factor threshold '$P_T$' maintained in memory 118 and determines (334) based on the comparison, whether the adjusted access probability factor is greater than the access probability factor threshold. When the adjusted access probability factor 'P' is less than or equal to the access probability factor threshold '$P_T$,' no further adjustment is made to the adjusted access probability factor 'P' and logic flow diagram proceeds to step 338. When the adjusted access probability factor 'P' is greater than the access probability factor threshold '$P_T$,' RAN 110 readjusts (336) the access probability factor 'P,' that is, sets the access probability factor 'P' equal to one (1). RAN 110 then determines (338) whether the (re)adjusted access probability factor 'P' is greater than one (1).

If RAN 110 determines that the (re)adjusted access probability factor 'P' is less than or equal to one (1), logic flow diagram 300 returns to step 306 and the RAN broadcasts a control message that includes the (re)adjusted access probability factor 'P' and further includes an identifier associated with the MBMS service via transceiver 112 and downlink control channel 132. In response to broadcasting the one or more control messages that includes the (re)adjusted access probability factor 'P,' RAN 110 receives (308) another quantity of responses, preferably requests to establish a connection, via uplink access channel 136. Again, the responses are conveyed to RAN 110 only by idle mode MSs subscribed to the MBMS service, as each MS subscribed to the MBMS service and maintaining an active connection to the RAN does not respond to the broadcast control message. RAN 110 then compares (310) the another quantity of responses to the adjusted multicast threshold 'M' to produce another comparison and determines, based on the another comparison and as is described above in steps 312 through 338, whether to establish a PTP communication or a PTM communication for conveyance of the MBMS data If RAN 110 determines that the (re)adjusted access probability factor 'P' is greater than one (1), the logic flow proceeds to step 322, wherein RAN 110 establishes a PTP communication channel in accordance with well known techniques with each MS 102-104 responding to the control message. RAN 110 then conveys (324), via transceiver 112 and the established FTP communication channels, the MBMS data to each of MSs 102-104. The logic flow then ends (318).

Figure 4:
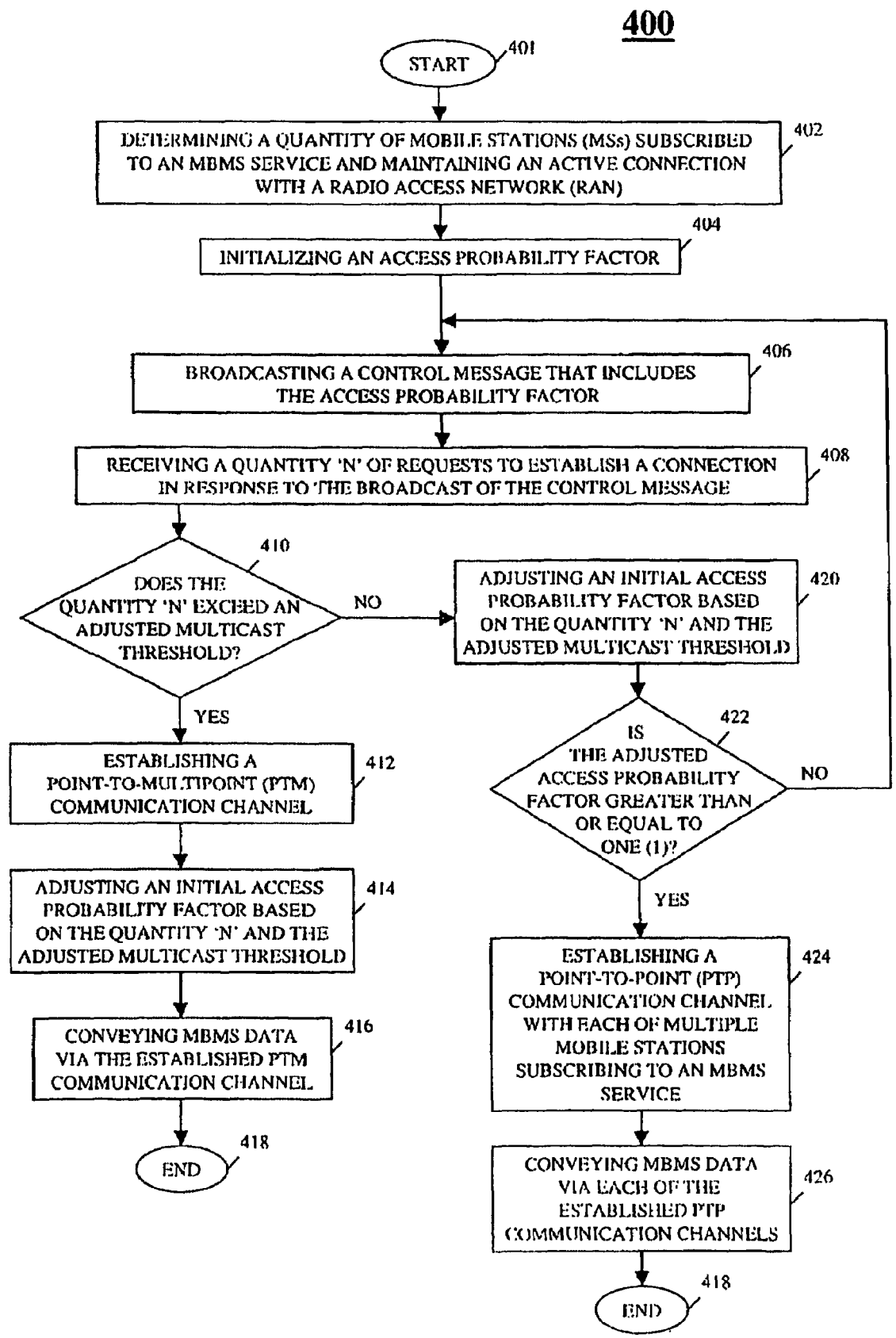
FIG. 4 is a logic flow diagram depicting a method for determining whether to to subscribing mobile stations in accordance with another embodiment of the present invention.

In another embodiment of the present invention, a simplified approach is provided to the determination of whether to establish a PTM communication a PTP communication based on a number of idle mode mobile stations responding to a control message. FIG. 4 depicts a logic flow diagram 400 of a method executed by communication system 100 in estimating a number of MSs subscribing to an MBMS service and determining whether to establish a PTM communication channel or multiple PTP communication channels in accordance with another embodiment of the present invention. Similar to logic flow diagram 300, logic flow diagram 400 begins (401) when RAN 110, and in particular controller 114, determines (402) a quantity of MSs subscribed to the MBMS service and maintaining an active connection with the RAN. Preferably processor 116 of controller 114 determines the quantity of MSs maintaining an active connection with the RAN by reference to memory 118.

RAN 110, specifically controller 114, initializes (404) an access probability factor 'P,' that is, sets 'P' equal to an initial access probability factor, '$P_{init}$,' that is maintained in memory 118 of controller 114. RAN 110 then broadcasts (406), via transceiver 112 and downlink control channel 132, preferably an MBMS control channel, one or more control messages that includes the initialized access probability factor 'P' and that further includes information that allows each MS 102-104 to determine that the MS is an intended recipient of the message. Similar to logic flow diagram 300, the one or more control messages preferably comprise a modified version of an MBMS notification message that is defined in 3GPP TS 23.846 v6.0.0, which notification message is modified to include the initialized access probability factor.

In response to broadcasting the one or more control messages that includes the initialized access probability factor 'P,' RAN 110 receives (408) a quantity of responses 'N,' preferably requests to establish a connection, via uplink access channel 136. The responses are conveyed to RAN 110 only by idle mode MSs subscribed to the MBMS service. Preferably, each request to establish a connection comprises a connection request, such as a Radio Resource Control (RRC) connection establishment request, and corresponds to an MS, such as MSs 102-104, subscribing the MBMS service and desirous of establishing a connection and receiving the MBMS data.

RAN 110 then determines (410) whether the quantity of responses 'N' is greater than or equal to the adjusted multicast threshold 'M.' When RAN 10 determines that 'N' is greater than or equal to 'M,' the RAN establishes (412) a PTM communication channel in accordance with well known techniques and adjusts (414) the initial access probability factor '$P_{init}$' based on the quantity of responses 'N' and the adjusted multicast threshold 'M.' Preferably, RAN 110 sets the initial access probability factor '$P_{init}$,' equal to P*M/N, that is, sets $P_{init}$=P*M/N. RAN 110 then conveys (416), via transceiver 112 and the established PTM communication channel, the MBMS data. The logic flow then ends (418).

When RAN 110 determines that the quantity of responses 'N' is less than the adjusted multicast threshold 'M,' the RAN adjusts (420) the access probability factor 'P' based on the quantity of responses 'N' and the adjusted multicast threshold 'M.' Preferably, RAN 110 sets the access probability factor 'P' equal to P*M/N, that is, sets P=P*M/N. RAN 110 then determines (422) whether the adjusted access probability factor 'P' is greater than or equal to one (1), that is, whether P≧1. When RAN 110 determines that 'P' is greater than or equal to one (1), the RAN establishes (424) a PTP communication channel in accordance with well known techniques with each MS 102-104 responding to the control message and conveys (426), via transceiver 112 and the established PTP communication channels, MBMS data to each of the MSs. The logic flow then ends (418). When RAN 110 determines that 'P' is less than one (1), logic flow diagram 400 returns to step 406, where the RAN broadcasts, via transceiver 112 and downlink control channel 132, preferably an MBMS control channel, one or more control messages that includes the adjusted access probability factor 'P' and that further includes information that allows each MS 102-104 to determine that the MS is an intended recipient of the message. Communication system 100 then repeats whichever steps are appropriate of steps 408 through 426.

Figure 5:
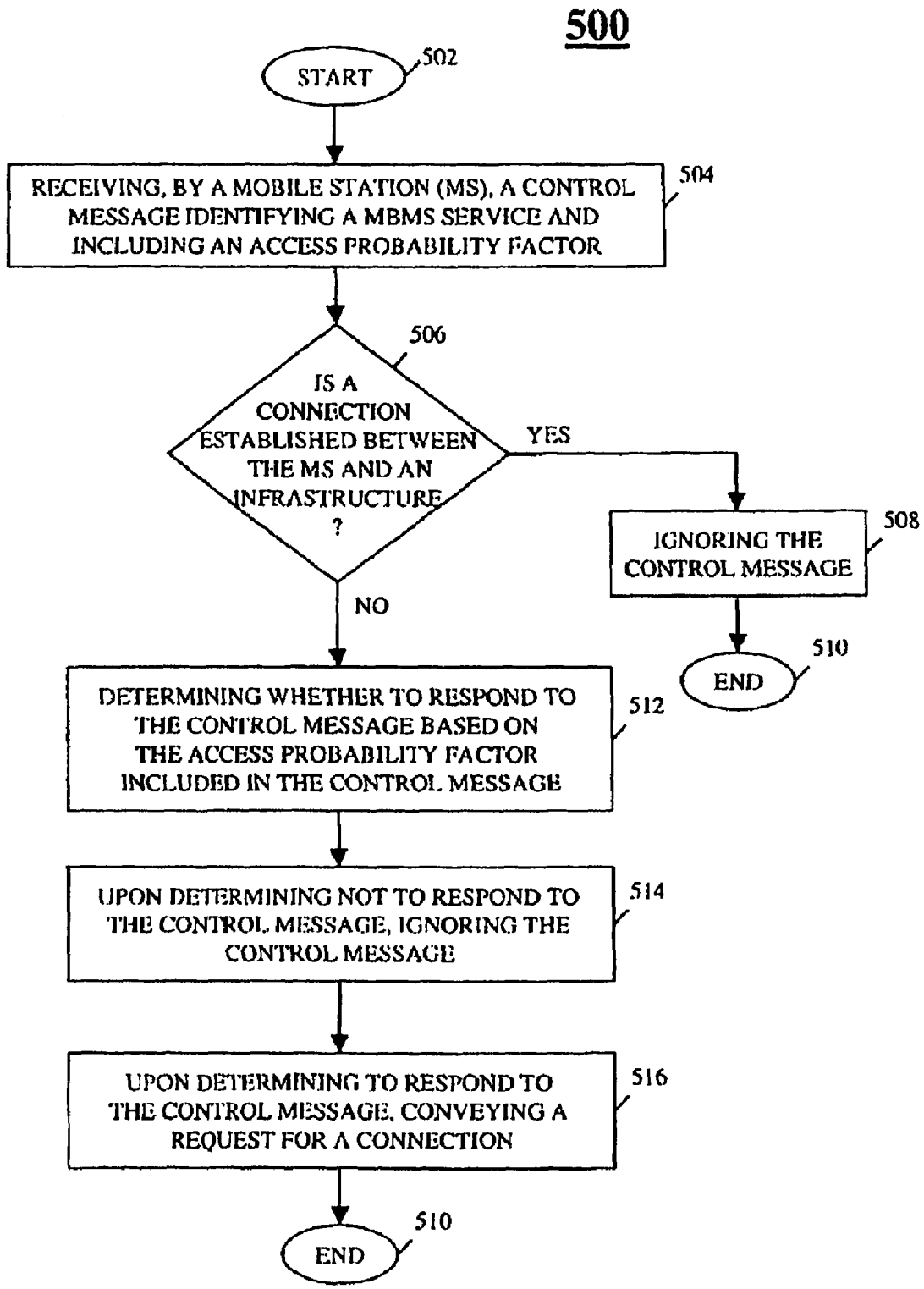
FIG. 5 is a logic flow diagram of steps executed by a mobile station of FIG. 1 in responding to a control message in accordance with an embodiment of the present invention.

FIG. 5 is a logic flow diagram 500 of steps executed by each of MSs 102-104 in responding to a control message received from RAN 110 in accordance with an embodiment of the present invention. Unless otherwise specified, all functions performed herein by each of MSs 102-104 are performed by processor 206 of the MS. Logic flow diagram 500 begins (502) when an MS, such as MSs 102-104, serviced by RAN 110 receives (504) a control message from the RAN identifying an MBMS service to which the MS subscribes. In response to receiving lie control message, the MS determines (506) whether the MS a connection, preferably a Resource Control (RRC) connection, is established between the MS and RAN 110. When the MS determines that a connection is established, the MS ignores (508), that is, does not respond to, the control message and the logic flow ends (510).

When the MS determines that a connection is not established, for example, when the MS is in an idle mode, the MS determines (512) whether to respond to the control message based on the access probability factor 'P' included in the control message.

Preferably, the step of determining whether to respond comprises the following steps. The MS performs a uniform random draw test over the interval [0,1] that produces probability factor '$P_{rand}$.' Uniform random draws tests are well known in the art and will not be described in greater detail. The MS then compares the probability factor produced by the uniform random draw test, that is, '$P_{rand}$,' to the access probability factor 'P' included in the control message. When the probability factor '$P_{rand}$' is greater than or equal to the access probability factor 'P,' the MS determines not to respond to the control message, that is, ignores (514) the control message, and the logic flow ends (510). When the probability factor '$P_{rand}$' is greater than or equal to the access probability factor 'P,' the MS determines to establish a connection, preferably an RRC connection, with RAN 110 and conveys (516) a request for a connection, preferably an RRC connection establishment request, to the RAN via uplink access channel 136. The logic flow then ends (510).

In summarization, communication system 100 determines whether to establish a PTM communication or a PTP communication for conveyance of Multimedia Broadcast Multicast Service (MBMS) data based on a number of MSs (102-104), both idle mode and maintaining an active connection, serviced by the system and subscribed to an MBMS service. Communication system 100 broadcasts a control message that includes an access probability factor. In order to avoid overloading the system with a number of responses generated in response to the control message, MSs maintaining an active connection ignore the control message while idle mode mobile stations determine whether to respond based on the access probability factor. Communication system 100 compares a number of responses received in response to the control message to a threshold and determines, based on the comparison, whether to establish a PTM communication or a PTP communication for conveyance of the MBMS data. When the comparison indicates that the number of responses does not exceed the threshold, communication system 100 may further consider one or more of the access probability factor and the quantity of responses received in determining whether to establish a PTM communication or a PTP communication. The system also adjusts the access probability factor based on the number of received responses in order to control a quantity of responses generated by any subsequent broadcasts of the control message.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for controlling access to a Multimedia Broadcast Multicast Service (MBMS) service comprising:
   determining a quantity of mobile stations (MSs) subscribed to the MBMS service and maintaining an active connection;
   determining an access probability factor;
   broadcasting a control message comprising the access probability factor;
   receiving, from each of one or more idle mode mobile stations, a response to the control message;
   comparing the number of received responses to a threshold to produce a comparison; and
   determining whether to establish a point-to-multipoint communication or a point-to-point communication based on the comparison, wherein it is determined to establish a point-to-multipoint communication when the number of responses exceeds the threshold; and
   upon determining to establish a point-to-multipoint communication:
      adjusting the access probability factor based on the number of responses from idle mode mobile stations and the threshold, and
      establishing a point-to-multipoint communication channel.

2. The method of claim 1, wherein the threshold comprises a threshold adjusted by the determined quantity of mobile stations subscribed to the Multimedia Broadcast Multicast Service (MBMS) service and maintaining an active connection.

3. The method of claim 1, wherein determining whether to establish a point-to-multipoint (PTM) communication or a point-to-point (PTP) communication comprises, when the number of received responses does not exceed the threshold, determining whether to establish a PTM communication or a PTP communication based on the access probability factor.

4. The method of claim 3, wherein determining whether to establish a point-to-multipoint (PTM) communication or a point-to-point (PTP) communication comprises:
   when the number of received responses docs not exceed the threshold, determining whether the access probability factor is equal to one (1);
   when the access probability factor is not equal to one (1), determining whether to establish a PTM communication or a PTP communication based on the number of idle mode mobile stations responding to the control message.

5. The method of claim 1, wherein determining to establish a point-to-point (PTP) communication comprises:
   determining whether the access probability factor is equal to one (1);
   when the number of received responses does not exceed the threshold and when the access probability factor is equal to one (a), establishing a PTP communication channel with each MS responding to the control message.

6. The method of claim 1, wherein determining to establish a point-to-point (PTP) communication comprises:
   determining whether the access probability factor is equal to one (1);
   when the access probability factor is not equal to one (1), determining whether the number of idle mode mobile stations responding to the control message is equal to zero (0); and
   when the number of received responses does not exceed the threshold and when the number of idle mode mobile stations responding to the control message is equal to zero (0), establishing a PTP communication channel with each MS responding to the control message.

7. The method of claim 1, wherein determining whether to establish a point-to-multipoint (PTM) communication or a point-to-point (PTP) communication when the number of received responses does not exceed the threshold comprises:
   determining whether the access probability factor is equal to one (1);
   when the access probability factor is not equal to one (1), determining whether the number of idle mode mobile stations responding to the control message is equal to zero (0); and
   when the number of idle mode mobile stations responding to the control message is not equal to zero (0):
      adjusting the access probability factor based on the number of idle mode mobile stations responding to the control message and the threshold to produce an adjusted access probability factor;
      determining whether to establish a PTM communication or a PTP communication based on the adjusted access probability factor.

8. The method of claim 7, wherein the control message comprises a first control message, the comparison comprises a first comparison and wherein determining, when the number of idle mode mobile stations responding to the control message is not equal to zero (0), whether to establish a point-to-multipoint (PTM) communication or a point-to-point (PTP) communication based on the adjusted access probability factor comprises:
  determining whether the adjusted access probability factor is greater than the threshold;
  when the adjusted access probability factor is not greater than the threshold, determining whether the adjusted access probability factor is greater than one (1);
  when the adjusted access probability factor is not greater than one (1);
    broadcasting a second control message comprising the adjusted access probability factor;
    receiving, from each of one or more idle mode mobile stations, a response to the second control message;
    comparing a number of responses received in response to the second control message to the threshold to produce a second comparison; and
    determining whether to establish a PTM communication or a PTP communication based on the second comparison.

9. The method of claim 7, wherein determining, when the number of idle mode mobile stations responding to the control message is not equal to zero (0): whether to establish a point-to-multipoint (PTM) communication or a point-to-point (PTP) communication based on the adjusted access probability factor comprises:
  determining whether the adjusted access probability factor is greater than the threshold;
  when the adjusted access probability factor is not greater than the threshold, determining whether the adjusted access probability factor is greater than one (1);
  when the adjusted access probability factor is greater than one (1), establishing a PTP communication channel with each MS responding to the control message.

10. The method of claim 7, wherein the control message comprises a first control message and the comparison comprises a first comparison, wherein determining, when the number of idle mode mobile stations responding to the control message is not equal to zero (0): whether to establish a point-to-multipoint (PTM) communication or a point-to-point (PTP) communication based on the adjusted access probability factor comprises:
  determining whether the adjusted access probability factor is greater than the threshold;
  when the adjusted access probability factor is greater than the threshold, setting the adjusted access probability factor to one (1);
    broadcasting a second control message comprising the adjusted access probability factor;
    receiving, from each of one or more idle mode mobile stations, a response to the second control message;
    comparing a number of responses, from the one or more idle mode mobile stations to the second control message, to the threshold to produce a second comparison; and
    determining whether to establish a PTM communication or a PTP communication based on the second comparison.

11. The method of claim 1, wherein determining whether to establish a point-to-multipoint communication or a point-to-point communication based on the number of responses comprises:
  adjusting the access probability factor based on the number of received responses to the control message to produce an adjusted access probability factor;
  determining whether the adjusted access probability factor is greater than or equal to one (1);
  when the adjusted access probability factor is greater than or equal to one (1), establishing a point-to-point (PTP) communication channel with each MS responding to the control message.

12. The method of claim 11, wherein the control message comprises a first control message, the comparison comprises a first comparison, and further comprising, when the when the adjusted access probability factor is less than one (1):
  broadcasting a second control message comprising the adjusted access probability factor;
  receiving, from each of one or more idle mode mobile stations, a response to the second control message comprising the adjusted access probability factor;
  comparing the number of received responses to the second control message to the threshold to produce a second comparison; and
  determining whether to establish a point-to-multipoint communication or a point-to-point communication based on the second comparison.

13. An apparatus for controlling access to a Multimedia Broadcast Multicast Service (MBMS) service comprising:
  at least one memory device that maintains an access probability factor and further maintains a record of a quantity of mobile stations (MSs) subscribed to the MBMS service and maintaining an active connection;
  a processor coupled to the at least one memory device that determines a quantity of mobile stations subscribed to the MBMS service and maintaining an active connection and an access probability factor by reference to the at least one memory device, conveys a control message comprising the access probability factor, receives, from each of one or more idle mode mobile stations, a response to the control message; compares the number of received responses to a threshold to produce a comparison, and determines whether to establish a point-to-multipoint communication or a point-to-point communication based on the comparison, determines to establish a point-to-multipoint communication when the number of responses exceeds the threshold, upon determining to establish a point-to-multipoint communication, adjusts the access probability factor based on the number of responses from idle mode mobile stations and the threshold and arranges for conveyance of Multimedia Broadcast Multicast Service data over a point-to-multipoint communication channel.

14. The apparatus of claim 13 wherein the threshold comprises a threshold adjusted by the determined quantity of mobile stations subscribed to the Multimedia Broadcast Multicast Service (MBMS) service and maintaining an active connection.

15. The method apparatus of claim 13, wherein, when the number of received responses does not exceed the threshold, the processor determines whether to establish a point-to-multipoint (PTM) communication or a point-to-point (PTP) communication based on the access probability factor.

16. The method apparatus of claim 15, wherein, when the number of received responses does not exceed the threshold and the access probability factor is not equal to one (1), the processor determining whether to establish a point-to-multipoint (PTM) communication or a point-to-point (PTP) communication based on the number of idle mode mobile stations responding to the control message.

17. The apparatus of claim 13, wherein the processor determines to convey Multimedia Broadcast Multicast Service (MBMS) data via a point-to-point (PTP) communication by determining whether the access probability factor is equal to one (1) and, when the access probability factor is equal to one (1), determining to convey MBMS data via a PTP communication channel.

18. The apparatus of claim 13, wherein the processor determines to convey Multimedia Broadcast Multicast Service (MBMS) data via a point-to-point (PTP) communication by determining whether the access probability factor is equal to one (1), when the access probability factor is not equal to one (1), determining whether the number of idle mode mobile stations responding to the control message is equal to zero (0), and when the number of idle mode mobile stations responding to the control message is equal to zero (0), determining to convey MBMS data via a PTP communication channel.

19. The apparatus of claim 13, wherein the processor determines whether to establish a point-to-multipoint (PTM) communication or a point-to-point (PTP) communication when the number of received responses does not exceed the threshold by determining whether the access probability factor is equal to one (1), when the access probability factor is not equal to one (1), determining whether the number of idle mode mobile stations responding to the control message is equal to zero (0), and when the number of idle mode mobile stations responding to the control message is not equal to zero (0), adjusting the access probability factor based on the number of idle mode mobile stations responding to the control message and the threshold to produce an adjusted access probability factor and determining whether to establish a PTM communication or a PTP communication based on the adjusted access probability factor.

20. The apparatus of claim 19, wherein the control message comprises a first control message, the comparison comprises a first comparison, and wherein, when the number of idle mode mobile stations responding to the control message is not equal to zero (0), the processor determines whether to establish a point-to-multipoint (PTM) communication or a point-to-point (PTP) communication based on the adjusted access probability factor by determining whether the adjusted access probability factor is greater than the threshold, when the adjusted access probability factor is not greater than the threshold, determining whether the adjusted access probability factor is greater than one (1), and when the adjusted access probability factor is not greater than one (1), conveying a second control message comprising the adjusted access probability factor, receiving, from each of one or more idle mode mobile stations, a response to the second control message, comparing a number of responses received in response to the second control message to the threshold to produce a second comparison, and determining whether to establish a PTM communication or a PTP communication based on the second comparison.

21. The apparatus of claim 19, wherein, when the number of idle mode mobile stations responding to the control message is not equal to zero (0), the processor determines whether to establish a point-to-multipoint (PTM) communication or a point-to-point (PTP) communication based on the adjusted access probability factor by determining whether the adjusted access probability factor is greater than the threshold, when the adjusted access probability factor is not greater than the threshold, determining whether the adjusted access probability factor is greater than one (1), and when the adjusted access probability factor is greater than one (1), arranging to convey Multimedia Broadcast Multicast Service (MBMS) data via a PTP communication channel.

22. The apparatus of claim 19, wherein the control message comprises a first control message, the comparison comprises a first comparison, and wherein, when the number of idle mode mobile stations responding to the control message is not equal to zero (0), the processor determines whether to establish a point-to-multipoint (PTM) communication or a point-to-point (PTP) communication based on the adjusted access probability factor by determining whether the adjusted access probability factor is greater than the threshold and, when the adjusted access probability factor is greater than the threshold, setting the adjusted access probability factor to one (1), conveying a second control message comprising the adjusted access probability factor, receiving, from each of one or more idle mode mobile stations, a response to the second control message, comparing a number of responses to the second control message to a threshold to produce a second comparison, and determining whether to establish a PTM communication or a PTP communication based on the second comparison.

23. The apparatus of claim 13, wherein the processor determines whether to establish a point-to-multipoint (PTM) communication or a point-to-point (PTP) communication by adjusting the access probability factor based on the number of received responses to the control message to produce an adjusted access probability factor, determining whether the adjusted access probability factor is greater than or equal to one (1), and when the adjusted access probability factor is greater than or equal to one (1), arranging for conveyance of Multimedia Broadcast Multicast Service (MBMS) data via a PTP communication.

24. The apparatus of claim 23, wherein the control message comprises a first control message, the comparison comprises a first comparison, and wherein the processor, when the adjusted access probability factor is less than one (1), conveys a second control message comprising the adjusted access probability factor, receives, from each of one or more idle mode mobile stations, a response to the second control message comprising the adjusted access probability factor, compares the number of received responses to the second control message to the threshold to produce a second comparison; and determines whether to establish a point-to-multipoint communication or a point-to-point communication based on the second comparison.

* * * * *

UNITED STATES PATENT AND TRADEMARK OFFICE
CERTIFICATE OF CORRECTION

PATENT NO. : 7,493,117 B2
APPLICATION NO. : 10/554154
DATED : February 17, 2009
INVENTOR(S) : Cai et al.

It is certified that error appears in the above-identified patent and that said Letters Patent is hereby corrected as shown below:

Title Page 2, in Field (56), under "OTHER PUBLICATIONS", in Column 2, Line 1, delete "Satus" and insert -- Status --, therefor.

In Column 2, Line 54, after "whether to" insert -- establish a PTM communication or a PTP communication for conveyance of MBMS data --.

In Column 4, Line 1, after "comprising", delete "and" and insert -- an --, therefor.

In Column 4, Line 24, delete "tip" and insert -- up --, therefor.

In Column 4, Line 43, delete "such a" and insert -- such as --, therefor.

In Column 4, Line 44, delete "in" and insert -- an --, therefor.

In Column 5, Line 23, delete "(OFDM)" and insert -- (OFDMA) --, therefor.

In Column 5, Line 37, delete "102-304," and insert -- 102-104, --, therefor.

In Column 5, Line 63, delete "all" and insert -- an --, therefor.

In Column 6, Line 4, delete "adoptively" and insert -- adaptively --, therefor.

In Column 6, Line 28, delete "algorithm)" and insert -- algorithm --, therefor.

In Column 6, Line 49, delete "10" and insert -- 110 --, therefor.

In Column 7, Line 60, delete "(3110)" and insert -- (310) --, therefor.

In Column 8, Line 22, delete "lie" and insert -- the --, therefor.

In Column 8, Line 29, after "equal" insert -- to --.

In Column 9, Line 5, delete "FTP" and insert -- PTP --, therefor.

In Column 10, Line 28, delete "lie" and insert -- the --, therefor.

In Column 10, Line 39-56, delete "Preferably, the step...........ends (510)." and insert the same at Line 38, after "message." as a continuation of paragraph.

UNITED STATES PATENT AND TRADEMARK OFFICE
CERTIFICATE OF CORRECTION

PATENT NO. : 7,493,117 B2
APPLICATION NO. : 10/554154
DATED : February 17, 2009
INVENTOR(S) : Cai et al.

It is certified that error appears in the above-identified patent and that said Letters Patent is hereby corrected as shown below:

In Column 12, Line 31, in Claim 5, delete "one (a)," and insert -- one (1), --, therefor.

In Column 13, Line 12, in Claim 8, delete "(1);" and insert -- (1): --, therefor.

In Column 13, Line 25, in Claim 9, delete "(0):" and insert -- (0), --, therefor.

In Column 13, Line 41, in Claim 10, delete "(0):" and insert -- (0), --, therefor.

In Column 14, Line 9, in Claim 12, after "comprising." delete "when the".

Signed and Sealed this

Eighteenth Day of August, 2009

David J. Kappos
*Director of the United States Patent and Trademark Office*